(12) United States Patent
Cheng et al.

(10) Patent No.: US 12,508,438 B2
(45) Date of Patent: Dec. 30, 2025

(54) SYSTEM AND METHOD FOR COLD PLASMA THERAPY WITH HER-FAMILY RECEPTORS

(71) Applicant: Jerome Canady Research Institute for Advanced Biological and Technological Sciences, Takoma Park, MD (US)

(72) Inventors: Xiaoqian Cheng, Falls Church, VA (US); Jerome Canady, Lakeland, FL (US)

(73) Assignee: US Patent Innovations, LLC, Annapolis, MD (US)

( * ) Notice: Subject to any disclaimer, the term of this patent is extended or adjusted under 35 U.S.C. 154(b) by 1182 days.

(21) Appl. No.: 16/547,940

(22) Filed: Aug. 22, 2019

(65) Prior Publication Data

US 2020/0069958 A1   Mar. 5, 2020

Related U.S. Application Data

(60) Provisional application No. 62/721,243, filed on Aug. 22, 2018.

(51) Int. Cl.
| | |
|---|---|
| *A61N 1/44* | (2006.01) |
| *A61B 18/04* | (2006.01) |
| *A61K 39/395* | (2006.01) |
| *C07K 16/32* | (2006.01) |

(52) U.S. Cl.
CPC .............. *A61N 1/44* (2013.01); *A61B 18/042* (2013.01); *A61K 39/39558* (2013.01); *C07K 16/32* (2013.01); *H05H 2245/32* (2021.05)

(58) Field of Classification Search
CPC .......... A61K 39/39558; C07K 2317/73; C07K 16/32; A61B 2018/00333; A61B 2018/00583; A61B 18/042; A61N 1/44; H05H 1/46; H05H 1/4652; H05H 2245/30
See application file for complete search history.

(56) References Cited

U.S. PATENT DOCUMENTS

| | | | |
|---|---|---|---|
| 8,663,643 B2 | 3/2014 | Berry et al. | |
| 9,999,462 B2 | 6/2018 | Canady et al. | |
| 10,023,858 B2 | 7/2018 | Canady et al. | |
| 10,213,614 B2 | 2/2019 | Keidar et al. | |
| 10,329,535 B2 | 6/2019 | Trink et al. | |
| 10,405,913 B2 | 9/2019 | Canady et al. | |
| 2017/0183631 A1 | 6/2017 | Keidar et al. | |
| 2018/0271579 A1 | 9/2018 | Keidar et al. | |

FOREIGN PATENT DOCUMENTS

WO   2018/191265 A1   10/2018

OTHER PUBLICATIONS

André et al., "Everolimus for women with trastuzumab-resistant, HER2-positive, advanced breast cancer (BOLERO-3): a randomised, double-blind, placebo-controlled phase 3 trial." The lancet oncology, 15(6), pp. 580-591 (Year: 2014).*
Dai et al., "The Emerging Role of Gas Plasma in Oncotherapy," Trends Biotechnology, 36(11) pp. 1183-1198, Epub Jul. 20, 2018, Accessed from the internet <doi: 10.1016/j.tibtech.2018.06.010> [retrieved on Apr. 25, 2022]. Retrieved from: <https://ieeexplore.ieee.org/abstract/document/6698377> (Year: 2018).*
Xu et al., "Quantitative assessment of cold atmospheric plasma anti-cancer efficacy in triple-negative breast cancers." Plasma Processes and Polymers, 15(8):1800052 pp. 1-11 (Year: 2018).*
Corsini et al., "Stroma cells: a novel target of herceptin activity." Clinical cancer research, 9(5), pp. 1820-1825 (Year: 2003).*
Kvam, E., et al., Nonthermal atmospheric plasma rapidly disinfects multidrug-resistant microbes by inducing cell surface damage. Antimicrob Agents Chemother, 2012. 56(4): p. 2028-36.
Keidar, M., Plasma for cancer treatment. Plasma Sources Science and Technology, 2015. 24(3): p. 033001.
Keidar, M., et al., Cold plasma selectivity and the possibility of a paradigm shift in cancer therapy. Br J Cancer, 2011. 105(9): p. 1295-301.
Vu, T. and F.X. Claret, Trastuzumab: updated mechanisms of action and resistance in breast cancer. Front Oncol, 2012. 2: p. 62.
Wang, M., et al., Cold atmospheric plasma for selectively ablating metastatic breast cancer cells. PLoS One, 2013. 8(9): p. e73741.
Kim, S.J., et al., Induction of apoptosis in human breast cancer cells by a pulsed atmospheric pressure plasma jet. Applied Physics Letters, 2010. 97(2): p. 023702.
Hudis, C.A., Trastuzumab—Mechanism of Action and Use in Clinical Practice. The New England Journal of Medicine, 2007. 357(1): p. 39-51.
Cuello, M., et al., Down-Regulation of the erbB-2 Receptor by Trastuzumab (Herceptin) Enhances Tumor Necrosis Factor-related Apoptosis-inducing Ligand-mediated Apoptosis in Breast and Ovarian Cancer Cell Lines that Overexpress erbB-2. cancer Research, 2001. 61: p. 4892-4900.

* cited by examiner

*Primary Examiner* — Fereydoun G Sajjadi
(74) *Attorney, Agent, or Firm* — 24IP Law Group USA, PLLC; Timothy R DeWitt

(57) ABSTRACT

A system and method for using a concomitant effect of cold atmospheric plasma and Trastuzumab to overcome Trastuzumab invalidity or resistance and enhances the outcome of breast cancer therapy in both HER2-positive and negative cancer cells.

3 Claims, 14 Drawing Sheets

|   | Trastuzumab (ug/mL) | | | | Plasma (s) | | | | control | | | |
|---|---|---|---|---|---|---|---|---|---|---|---|---|
| A |   |   |   |   |   |   |   |   | He |   |   |   |
| B | 2 | 4 | 6 | 8 | 30 | 60 | 90 | 120 | 60 | C |   |   |
| C | 2 | 4 | 6 | 8 | 30 | 60 | 90 | 120 | 60 | C |   |   |
| D | 2 | 4 | 6 | 8 | 30 | 60 | 90 | 120 | 60 | C |   |   |
| E | 2 | 4 | 6 | 8 | 30 | 60 | 90 | 120 | 60 | C |   |   |
| F | 2 | 4 | 6 | 8 | 30 | 60 | 90 | 120 | 60 | C |   |   |
| G | 2 | 4 | 6 | 8 | 30 | 60 | 90 | 120 | 60 | C |   |   |
| H |   |   |   |   |   |   |   |   |   |   |   |   |
|   | 1 | 2 | 3 | 4 | 5 | 6 | 7 | 8 | 9 | 10 | 11 | 12 |

Fig. 7

|   |   |   | Trastuzumab (ug/mL) | | Trastuzumab (ug/mL) + Plasma (s) | | Plasma (s) | | Control | |   |   |   |
|---|---|---|---|---|---|---|---|---|---|---|---|---|---|
| A |   |   |   |   |   |   |   |   |   |   |   |   | A |
| B |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | B |
| C |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | C |
| D |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | D |
| E |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | E |
| F |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | F |
| G |   |   | $ID_{50}(T)$ | $ID_{50}(T)$ | $ID_{50}(P)$ $ID_{50}(T)$ | $ID_{50}(P)$ $ID_{50}(T)$ | $ID_{50}(P)$ | $ID_{50}(P)$ | C | C |   |   | G |
| H |   |   |   |   |   |   |   |   |   |   |   |   | H |
|   | 1 | 2 | 3 | 4 | 5 | 6 | 7 | 8 | 9 | 10 | 11 | 12 |   |

Fig. 8

SYSTEM AND METHOD FOR COLD PLASMA THERAPY WITH HER-FAMILY RECEPTORS

CROSS-REFERENCE TO RELATED APPLICATIONS

The present application claims the benefit of the filing date of U.S. Provisional Patent Application Ser. No. 62/721,243 filed by the present inventors on Aug. 22, 2018.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to cold plasma therapy, and more specifically, to cold plasma therapy with Trastuzumab.

Brief Description of the Related Art (0005) About 20% of invasive breast carcinomas show overexpression of human epidermal growth factor receptor type 2 (HER2), and patients with HER2-positive tumors have a decreased overall survival rate. Slamon, D., et al., *Human breast cancer: correlation of relapse and survival with amplification of the HER-2 neu oncogene*. Science, 1987. 235(4785): p. 177-182. Trastuzumab (or Herceptin) is a Food and Drug Administration (FDA)-approved targeted therapy for breast cancer. Trastuzumab, developed by Genentech Inc (San Francisco, CA USA), is a humanized monoclonal antibody, which binds to the extracellular domain of HER2 and inhibits the proliferation and survival of HER2-dependent tumor.

U.S. Pat. No. 8,663,643 disclosed that combinations of the antibody-drug conjugate trastuzumab MCC-DMI and chemotherapeutic agents, including stereoisomers, geometric isomers, tautomers, solvates, metabolites and pharmaceutically acceptable salts thereof, are useful for inhibiting tumor cell growth, and for treating disorders such as cancer mediated by HER2 and KDR (VEG FR receptor I).

Trastuzumab has served as a remarkable example of a successful targeted therapy in HER2-overexpressing breast cancer patients, however, there is no specific drug or chemotherapy recommended for HER2-nagative patients. In addition, less than 35% of patients with HER2-positive breast cancer initially respond to trastuzumab. On the other hand, about 70% of patients who initially responded experience progression to metastatic disease within a year. Therefore, it is of great importance to establish a novel therapy to overcome Trastuzumab invalidity or resistance.

Cold atmospheric plasma (CAP) has been intensively investigated recently. It has been proven to be effective in wound healing (Isbary, G., et al., *Successful and safe use of 2 min cold atmospheric argon plasma in chronic wounds: results of a randomized controlled trial*. Br J Dermatol, 2012. 167(2): p. 404-10), sterilization (Katayama, H., et al., *Decomposition of Persistent Organics in Water Using a Gas-Liquid Two-Phase Flow Plasma Reactor*. IEEE Transactions on Plasma Science, 2009. 37(6): p. 897-904), antifungal treatments (Kvam, E., et al., *Nonthermal atmospheric plasma rapidly disinfects multidrug-resistant microbes by inducing cell surface damage*. Antimicrob Agents Chemother, 2012. 56(4): p. 2028-36), and cancer therapy (Keidar, M., *Plasma for cancer treatment*. Plasma Sources Science and Technology, 2015. 24(3): p. 033001; Keidar, M., et al., *Cold plasma selectivity and the possibility of a paradigm shift in cancer therapy*. Br J Cancer, 2011. 105(9): p. 1295-301). Selectivity in cancer therapy is one of the most significant features of cold plasma. This project will study the synergistic effect of Trastuzumab and cold plasma in breast cancer treatment, on both of HER2-positive, HER2-nagative cell types.

The mechanism of Trastuzumab triggering HER2-overexpressing cancer death is summarized as: 1. HER2 degradation; 2. Antibody-dependent cellular cytotoxicity; 3. MAPK and PI3K/Akt interference. However, some HER2-overexpressing cancer patients are resistant to Trastuzumab therapy, mainly because: (1) steric effects of HER2 receptor; (2) overexpression of other tyrosine kinase receptors; and (3) intracellular alternations of PTEN (Vu. T. and F. X. Claret, *Trastuzumab: updated mechanisms of action and resistance in breast cancer*. Front Oncol, 2012. 2: p. 62).

Wang et al. demonstrated that breast cancer cell line MDA-MB-231 is more sensitive to cold plasma treatment than mesenchymal stem cells (MSC) under the plasma dose conditions tested. Wang, M., et al., *Cold atmospheric plasma for selectively ablating metastatic breast cancer cells*. PLoS One, 2013. 8(9): p. e73741. The migration and invasion of MDA-MB-231 cells are inhibited by cold plasma treatment. Kim et al. studied the breast cell line MCF-7 treated by a pulsed atmospheric cold plasma jet, showing that the apoptotic effect is dependent on the components of plasma plume. Kim, S. J., et al., *Induction of apoptosis in human breast cancer cells by a pulsed atmospheric pressure plasma jet*. Applied Physics Letters, 2010. 97(2): p. 023702.

SUMMARY OF THE INVENTION

To overcome Trastuzumab invalidity or resistance, a concomitant effect of cold atmospheric plasma and Trastuzumab enhances the outcome of breast cancer therapy in both HER2-positive and negative cancer cells. Trastuzumab alone will induce the HER2-positive cancer cell death but not the HER2-negative cancer cells.

For HER2-positive cancer cells, CAP will induce intracellular oxidative stress (ROS) generation, which will increase the possibility of cell apoptosis. In addition, it is anticipated that CAP will function through the same mechanism as Trastuzumab, which decreases signaling by prevention of HER2-receptor dimerization with HER-family, increased endocytotic destruction of the receptor, inhibition of shedding of the extracellular domain, and immune activation. Hudis. C. A., *Trastuzumab—Mechanism of Action and Use in Clinical Practice*. The New England Journal of Medicine, 2007. 357(1): p. 39-51.

For HER2-negative cancer cells, the utilization of cold plasma not only will stimulate intracellular ROS generation, but also alter the cell signaling pathways which will overexpress HER2 receptor.

Cuello et al reported that combined treatment with tumor necrosis factor-related apoptosis-inducing ligand (TRAIL) and trastuzumab could enhance the specific killing of cells that overexpress HER2 Cuello, M., et al., *Down-Regulation of the erbB-2 Receptor by Trastuzumab (Herceptin) Enhances Tumor Necrosis Factor-related Apoptosis-inducing Ligand-mediated Apoptosis in Breast and Ovarian Cancer Cell Lines that Overexpress erbB-2*. cancer Research, 2001. 61: p. 4892-4900. In previous work, we have identified a novel mechanism by which cold plasma induces mitochondrial cell stress triggering elevated levels of TRAIL R-1 expression and mediating apoptosis in tumor cells. Therefore, it is believed that the cell viability of both HER2-positive and negative cancer cells will decrease significantly with plasma and Trastuzumab treatment together, while the viability of normal cells will not be significantly decreased.

In a preferred embodiment, the present invention is a method for using a concomitant effect of cold atmospheric plasma and Trastuzumab to overcome Trastuzumab invalidity or resistance and enhances the outcome of breast cancer therapy in both HER2-positive and negative cancer cells. In the method, samples of a tumor cell line are treated with Trastuzumab at various dosages. An $ID_{50}$ value for Trastuzumab is calculated with a processor and stored in an electronic storage. The cancer cell line samples are treated with cold atmospheric plasma at various settings. An $ID_{50}$ value for the CAP treatment is calculated with a processor and stored in an electronic storage. The $ID_{50}$ values for Trastuzumab and CAP are then used concomitantly to treat the cancer.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which:

FIG. 7 is a table illustrating 96-well plate layout for cytotoxicity of Trastuzumab or plasma treatment.

FIG. 8 is a table illustrating 96-well plate layout for cytotoxicity of Trastuzumab with plasma treatment.

DETAILED DESCRIPTION OF THE PREFERRED EMBODIMENTS

The present invention is described by way of examples. HER2-positive breast cancer cell line SkBr3, HER2-nagative breast cancer cell line MDA-MB-231, and normal breast cell line MCF-12A are used.

Plasma and Trastuzumab treatment on breast cancer therapy separately and cooperatively was investigated on both of HER2-positive and HER2-nagative cell types. The following work will be addressed:

HER2-positive (SkBr3)+CAP: viability decreases, HER2 down-regulated;
HER2-positive (SkBr3)+Trastuzumab: viability decreases, HER2 down-regulated;
HER2-negative (MDA-MB-231)+CAP: viability decreases. HER2 up-regulated;
HER2-negative (MDA-MB-231)+Trastuzumab: viability no significant change (control);
HER2-negative (MDA-MB-231)+CAP+Trastuzumab: viability decreases;
Normal breast epithelial cells (MCF-12A)+CAP: viability no significant change (control); and
Normal breast epithelial cells (MCF-12A)+Trastuzumab: viability no significant change (control).

Figure 9:
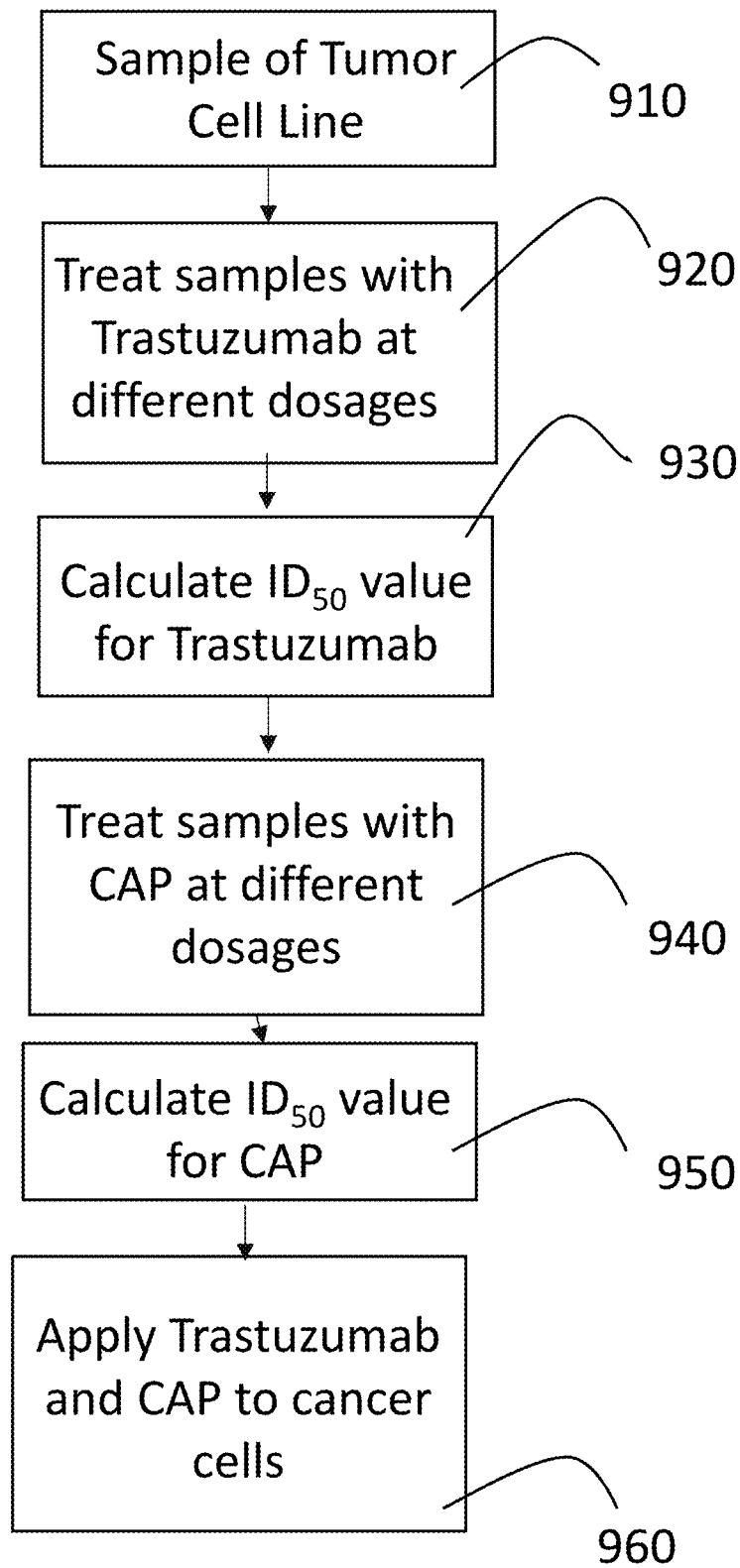
FIG. 9 is a flow chart illustrating a method for treating cancer cells in accordance with a preferred embodiment of the present invention.

A method in accordance with a preferred embodiment of the present invention is described with reference to FIG. 9. Samples of a tumor cell line (910) are treated with Trastuzumab at various dosages (920). An $ID_{50}$ value for Trastuzumab is calculated with a processor and stored in an electronic storage (930). The cancer cell line samples are treated with cold atmospheric plasma at various settings (940). An $ID_{50}$ value for the CAP treatment is calculated with a processor and stored in an electronic storage (950). The $ID_{50}$ values for Trastuzumab and CAP are then used concomitantly to treat the cancer (960).

Several CAP-generating systems recently have been proposed, including a CAP-enabled generator and an LF converter to be used with a traditional generator. These systems may be used in the method of the present invention.

A preferred embodiment of a CAP enabled generator is described with reference to the drawings. A gas-enhanced electrosurgical generator 100 in accordance with a preferred embodiment of the present invention is shown in FIGS. 1A-1G. The gas-enhanced generator has a housing 110 made of a sturdy material such as plastic or metal similar to materials used for housings of conventional electrosurgical generators. The housing 110 has a removable cover 114. The housing 110 and cover 114 have means, such as screws 119, tongue and groove, or other structure for removably securing the cover to the housing. The cover 114 may comprise just the top of the housing or multiple sides, such as the top, right side and left side, of the housing 110. The housing 110 may have a plurality of feet or legs 140 attached to the bottom of the housing. The bottom 116 of the housing 110 may have a plurality of vents 118 for venting from the interior of the gas-enhanced generator.

On the face 112 of the housing 114 there is a touch-screen display 120 and a plurality of connectors 132, 134 for connecting various accessories to the generator, such as an argon plasma probe, a hybrid plasma probe, a cold atmospheric plasma probe, or any other electrosurgical attachment. There is a gas connector 136 for connecting, for example, a $CO_2$ supply for insufflating an abdomen. The face 112 of the housing 110 is at an angle other than 90 degrees with respect to the top and bottom of the housing 110 to provide for easier viewing and use of the touch screen display 120 by a user.

Figure 1A:
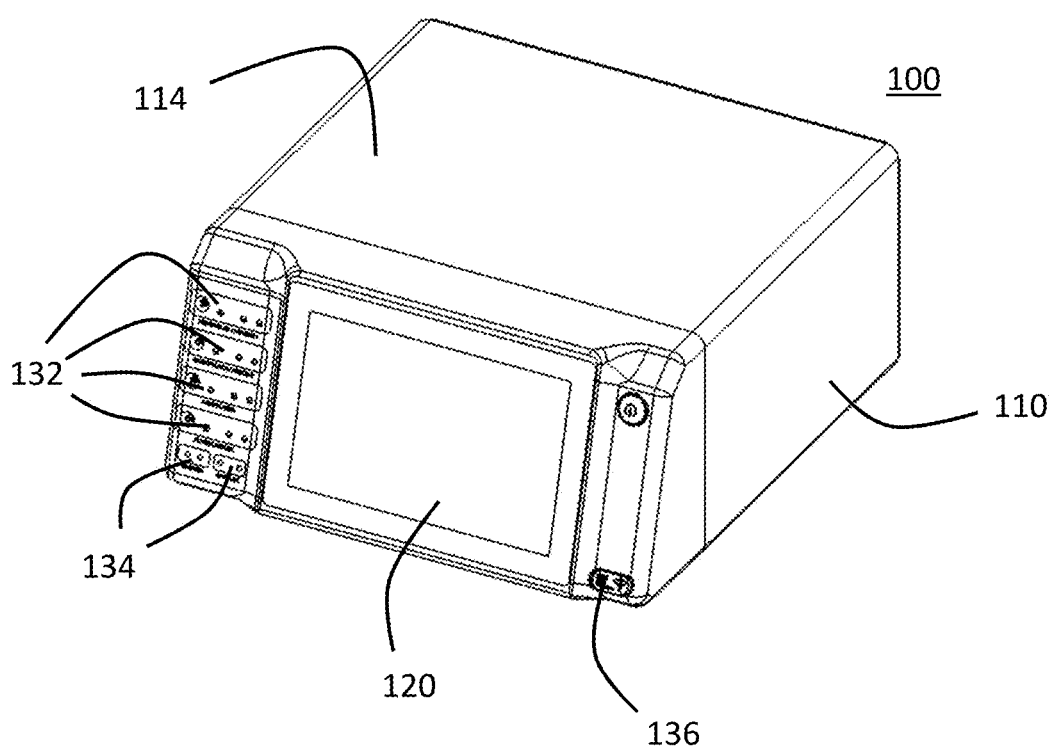
FIG. 1A is a perspective view of a preferred embodiment of a gas-enhanced electrosurgical generator.
Figure 1B:
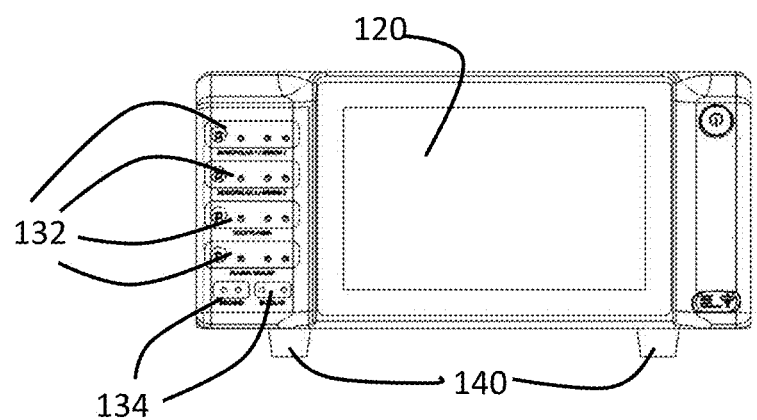
FIG. 1B is a front view of a preferred embodiment of a gas-enhanced electrosurgical generator.
Figure 1C:
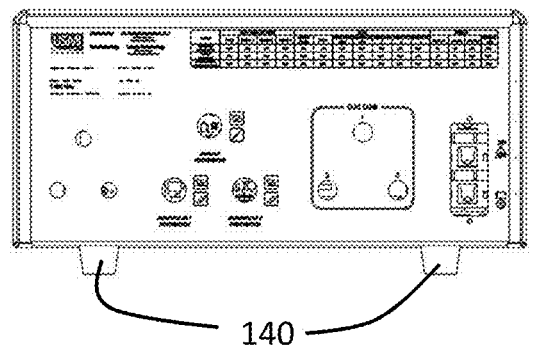
FIG. 1C is a rear view of a preferred embodiment of a gas-enhanced electrosurgical generator.
Figure 1D:
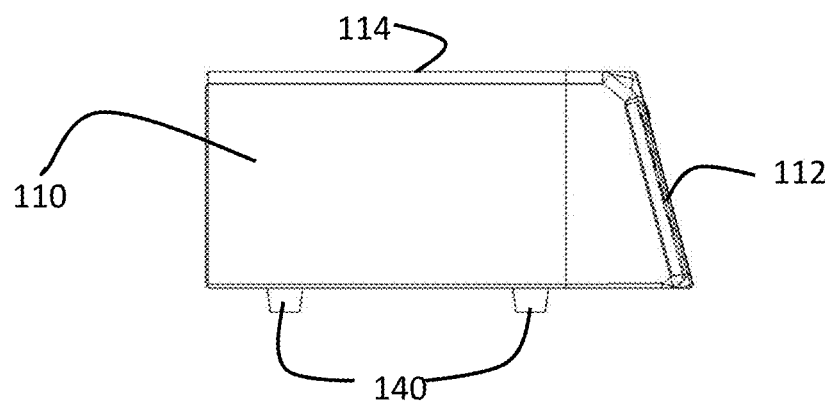
FIG. 1D is a left side view of a preferred embodiment of a gas-enhanced electrosurgical generator.
Figure 1E:
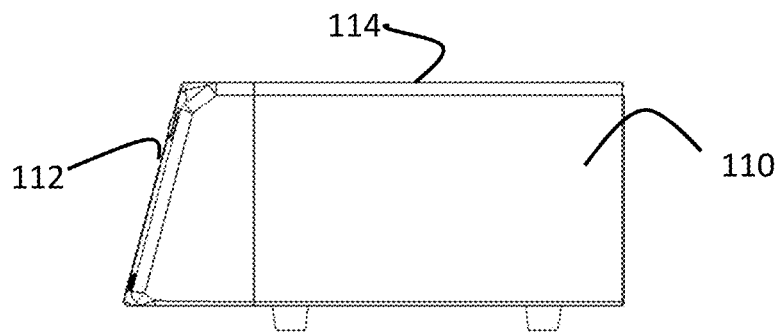
FIG. 1E is a right view of a preferred embodiment of a gas-enhanced electrosurgical generator.
Figure 1F:
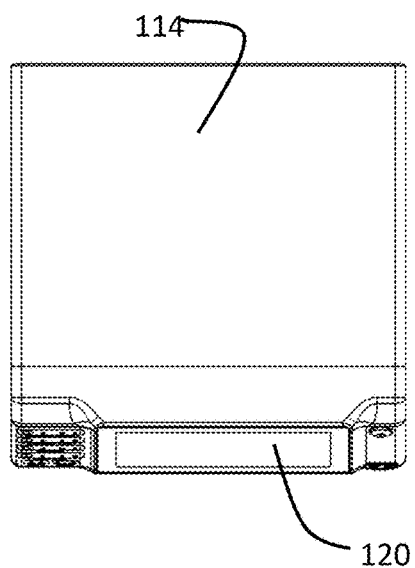
FIG. 1F is a top view of a preferred embodiment of a gas-enhanced electrosurgical generator.
Figure 1G:
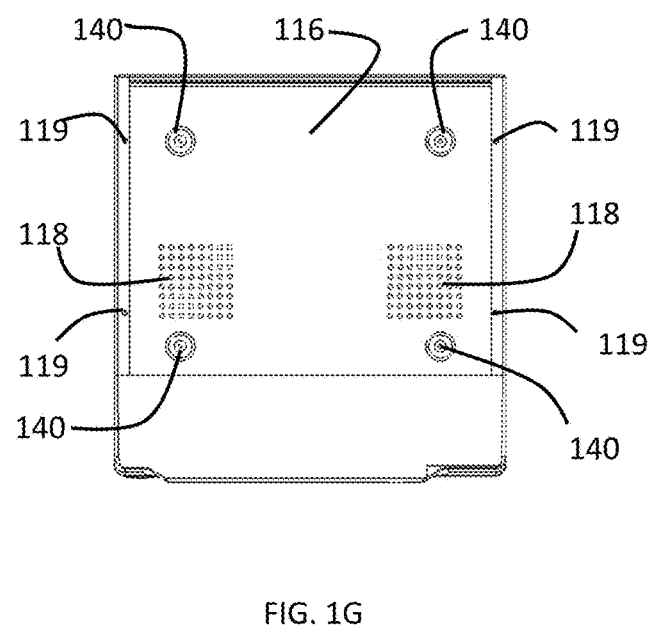
FIG. 1G is a bottom view of a preferred embodiment of a gas-enhanced electrosurgical generator.
Figure 2A:
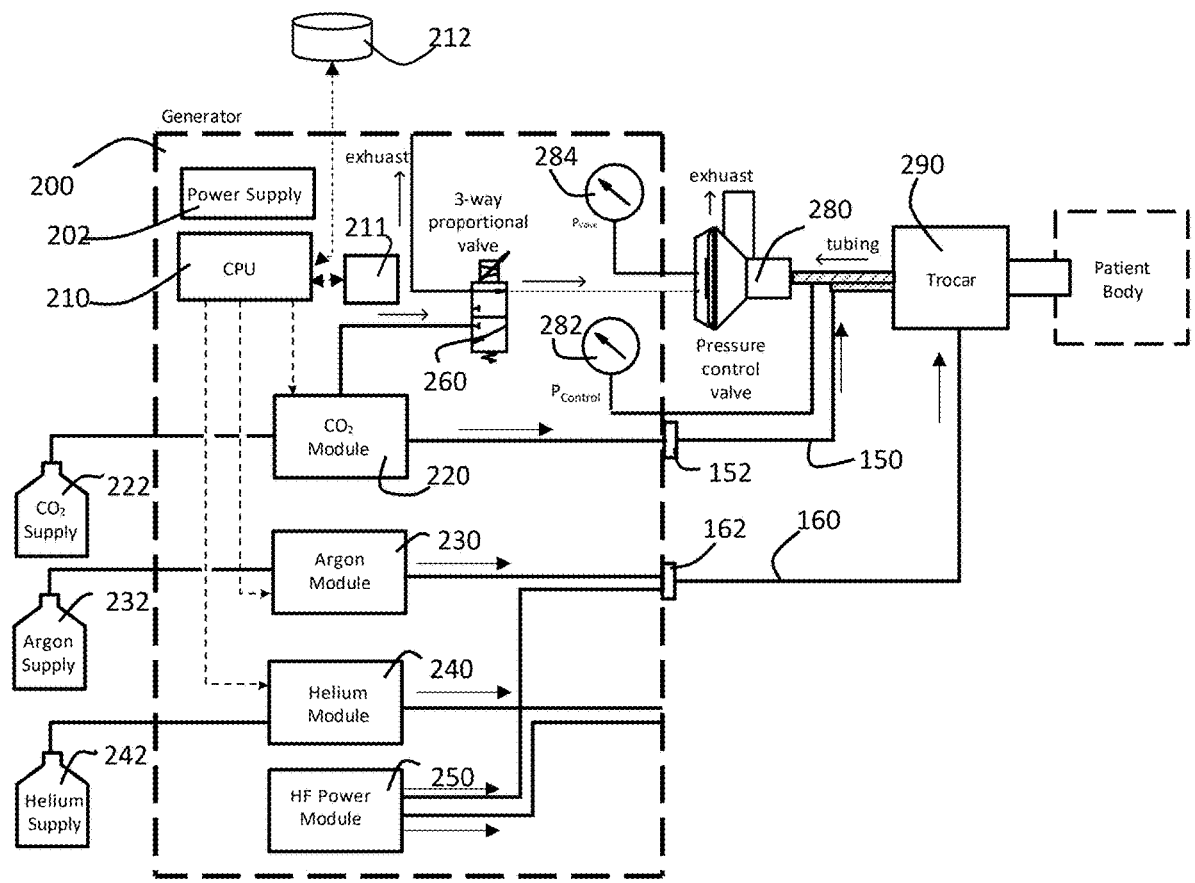
FIG. 2A is a block diagram of a preferred embodiment of pressure control system of a gas-enhanced electrosurgical generator in accordance with the present invention configured to perform an argon-enhanced electrosurgical procedure.

One or more of the gas control modules may be mounting within a gas-enhanced electrosurgical generator 100. A gas pressure control system 200 for controlling a plurality of gas control modules 220, 230, 240 within a gas-enhanced electrosurgical generator is described with reference to FIGS. 2A-2D. A plurality of gas supplies 222, 232, 242 are connected to the gas pressure control system 200, and more specifically, to the respective gas control modules 220, 230, 240 within the gas pressure control system 200. The gas pressure control system 200 has a power supply 202 for supplying power to the various components of the system. A CPU 210 controls the gas pressure control modules 220, 230, 240 in accordance with settings or instructions entered into the system through a graphical user interface on the display 120. The system is shown with gas control modules for $CO_2$, argon and helium, but the system is not limited to those particular gases. In the embodiment shown in FIGS. 2A-2D, the $CO_2$ is shown as the gas used to insufflate an abdomen (or other area of a patient). The gas pressure control system 200 has a 3-way proportional valve connected to the gas control module 220. While FIG. 2A shows the 3-way proportional valve connected only to the CO2 control module 220, the 3-way proportional valves could be connected to a different gas control module 230 or 240. The gas pressure control system 200 further has an HF power module 250 for supplying high frequency electrical energy for various types of electrosurgical procedures. The HF power module contains conventional electronics such as are known for provide HF power in electrosurgical generators. Exemplary systems include, but are not limited to, those disclosed in U.S. Pat. Nos. 4,040,426 and 4,781,175. The system further could have a converter unit for converting the HF power to a lower frequency, such as may be used for cold atmospheric plasma and is described in U.S. Patent Application Publication No. 2015/0342663.

Figure 2B:
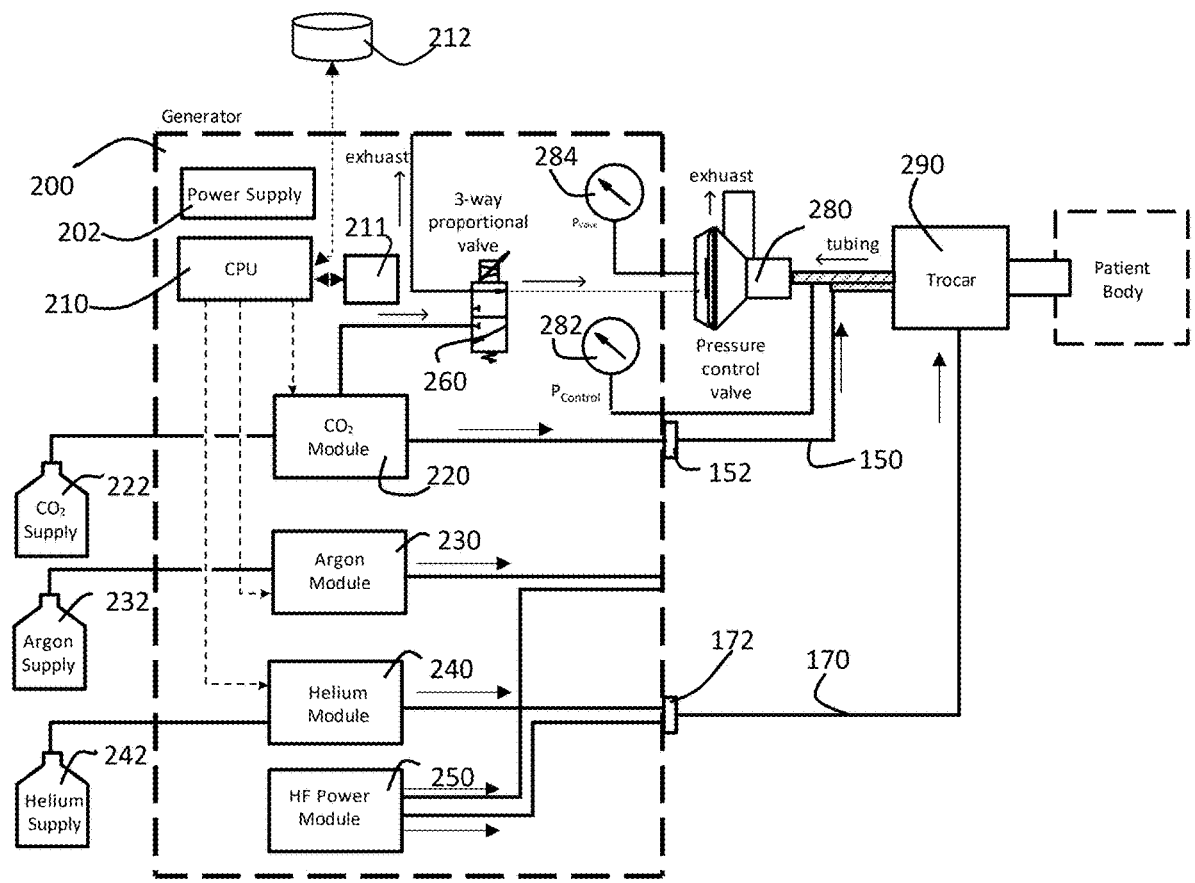
FIG. 2B is a block diagram of a preferred embodiment of pressure control system of a gas-enhanced electrosurgical generator in accordance with the present invention configured to perform a cold atmospheric plasma procedure.
Figure 2C:
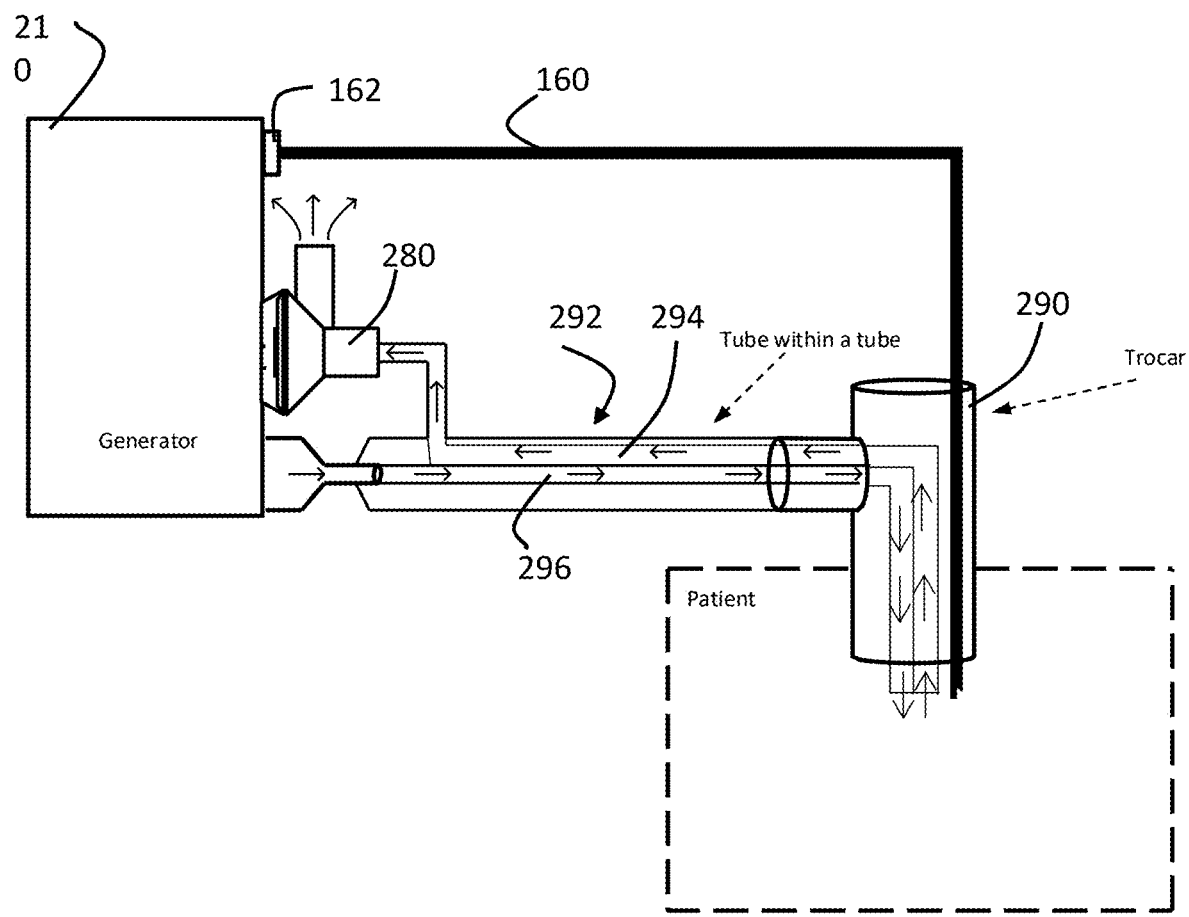
FIG. 2C is a diagram of a trocar for the embodiment of FIG. 2A in accordance with the present invention.

The outlet port of gas control module 220 is connected to a connector 136 on the generator housing. While connector 136 and the other connectors are shown on the front face of the housing 110, they could be elsewhere on the housing. The outlet ports of gas control modules 230, 240 each are connected to tubing or other channel to a connector 132. A connector 152 connects to connector 136 and is as tubing that runs to and connects to tubing 292. The tubing 292 is connected to a pressure control valve or stopcock 280 and extends into the trocar. The pressure control valve 280 is used to control pressure within the patient. The gas pressure control system further has a pressure sensor 282 connected to the tubing 292 to sense pressure in the tubing 292 and a pressure sensor 284 for sensing pressure in the pressure control valve 280. As shown in FIG. 2C, the tubing 292 is a tube within a tube such that gas supplied from the generator travels to the trocar and patient through tube 296 and gas is released out of the patient through tube 294.

As shown in FIG. 2A the connector 132 to which control module 230 is connected has a gas-enhanced electrosurgical instrument 160 having a connector 162 connected to in. In FIG. 2A, gas control module 230 controls flow of argon gas, so the instrument 160 is an argon gas-enhanced electrosurgical tool such as an argon plasma probe such as is disclosed in U.S. Pat. No. 5,720,745, a hybrid plasma cut accessory such as is disclosed in U.S. Patent Application Publication No. 2017/0312003 or U.S. Patent Application Publication No. 2013/0296846, or a monopolar sealer such as is disclosed in U.S. Patent Application Publication No. 2016/0235462. Other types of argon surgical devices similarly can be used. As shown in FIG. 2B the connector 132 to which control module 240 is connected has a gas-enhanced electrosurgical instrument 170 having a connector 172 connected to in. In FIG. 2B, gas control module 240 controls flow of helium gas, so the instrument 170 is, for example, a cold atmospheric plasma attachment such as is disclosed in U.S. Patent Application Publication No. 2016/0095644.

The system provides for control of intraabdominal pressure in a patient. The pressure control valve 280 has a chamber within it. The pressure in that chamber is measured by pressure sensor 284. $CO_2$ is supplied to the chamber within pressure control valve 280 from gas control module 220 via 3-way proportional valve 260. Pressure in that chamber within the pressure control valve 280 also may be released via 3-way proportional valve 260. In this manner, the system can use the pressure sensor 284 and the 3-way proportional valve to achieve a desired pressure (set through a user interface) in the chamber within the pressure control valve 280. The pressure sensor 282 senses the pressure in the tubing 294 (and hence the intraabdominal pressure). The pressure control valve 280 then releases pressure through its exhaust to synchronize the intraabdominal pressure read by sensor 282 with the pressure in the chamber within the pressure control valve as read by pressure sensor 284. The readings from sensors 282, 284 can be provided to CPU 210, which in turn can control flow of $CO_2$ and one of argon and helium, depending on the procedure being performed, to achieve a stable desired intraabdominal pressure.

Figure 2D:
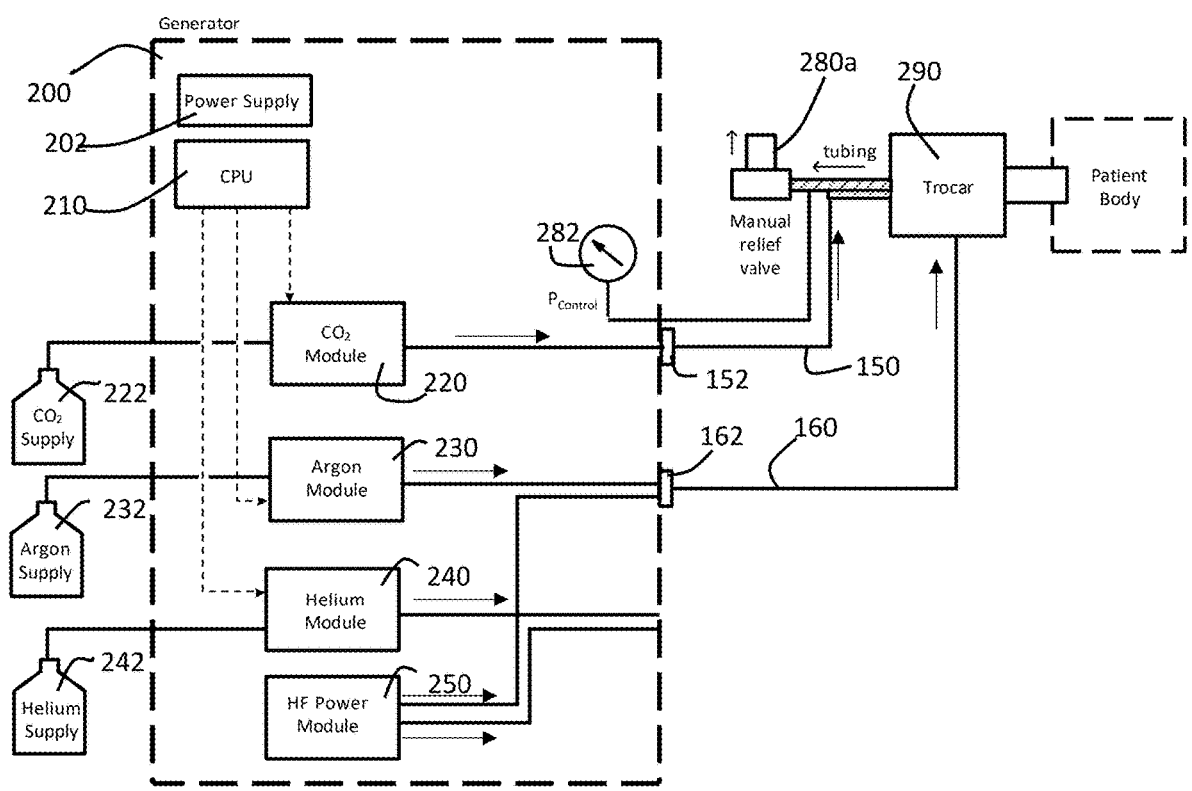
FIG. 2D is a block diagram of an alternate preferred embodiment of pressure control system of a gas-enhanced electrosurgical generator in accordance with the present invention configured to perform an argon-enhanced electrosurgical procedure.

An alternative embodiment of the gas pressure control system is shown in FIG. 2D. This this system the automatic stopcock or pressure control valve 280 has been replaced by a manual relief valve 280a that is controlled or operated by the surgeon using the system.

A gas control module 300 in accordance with the present invention is designed for gas-enhanced electrosurgical systems. Conventionally, gas-enhanced electrosurgical systems have an electrosurgical generator and a gas control unit that have separate housings. The conventional gas control unit typically controls only a single gas such as argon, $CO_2$ or helium. The present invention is a gas control module 300 that may be used in a gas control unit or in a combined unit functioning both as an electrosurgical generator and as a gas control unit. Further, a plurality of gas control modules in accordance with the present invention may be combined in a single gas control unit or combination generator/gas control unit to provide control of multiple gases and provide control for multiple types of gas-enhanced surgery such as argon gas coagulation, hybrid plasma electrosurgical systems and cold atmospheric plasma systems.

Figure 3A:
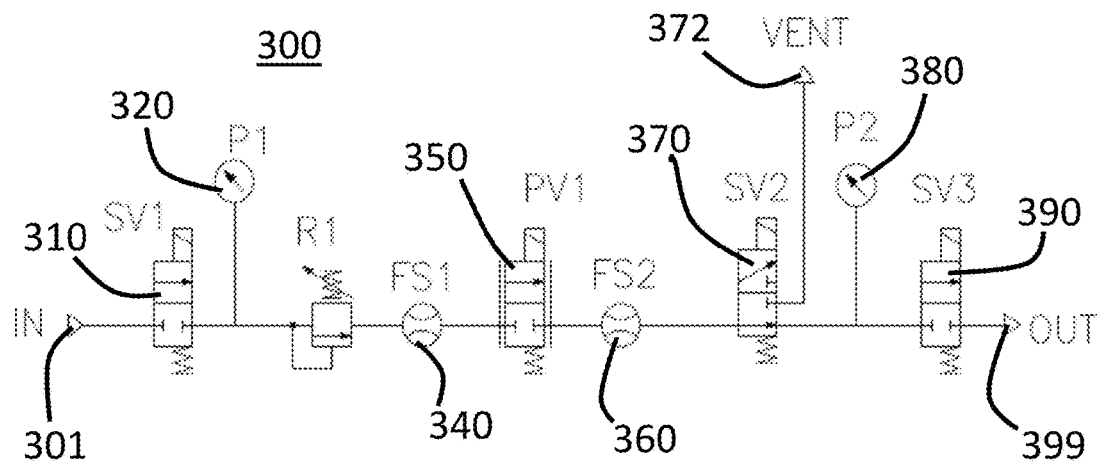
FIG. 3A is a schematic flow diagram illustrating the gas flow through the module and the method by which the module controls the gas flow in accordance with a preferred embodiment of the present invention.

FIG. 3A is a schematic flow diagram illustrating the gas flow through the gas control module 300 and the method by which the module 300 controls the gas flow in accordance with a preferred embodiment of the present invention. As shown in FIG. 3A, the gas enters the gas control module at an inlet port (IN) 301 and proceeds to first solenoid valve (SV1) 310, which is an on/off valve. In an exemplary embodiment, the gas enters the gas module at a pressure of 75 psi. The gas then proceeds to a first pressure sensor (P1) 320, to a first pressure regulator (R1) 330. In an exemplary embodiment, the first pressure regulator (R1) 330 reduces the pressor of the gas from 75 psi to 18 psi. After the pressure regulator (R1) 330, the gas proceeds to flow sensor (FS1) 340, which sense the flow rate of the gas. Next, the gas proceeds to proportional valve (PV1) 350, which permits adjustment of a percentage of the opening in the valve. The gas then proceeds to a second flow sensor (FS2) 360, which senses the flow rate of the gas. This second flow sensor (FS2) 360 provides redundancy and thus provides greater safety and accuracy in the system. Next the gas proceeds to a second solenoid valve (SV2) 370, which is a three-way valve that provides for a vent function that can allow gas to exit the module through a vent 372. The gas then proceeds to a second pressure sensor (P2) 380, which provides a redundant pressure sensing function that against produces greater safety and accuracy of the system. Finally, the gas proceeds to a third solenoid valve (SV3) 390, which is a two-way on/off valve that is normally closed and is the final output valve in the module. The gas exits the module at and output port (OUT) 399, which is connected to tubing or other channel that provides a passageway for the gas to flow to an accessory connected to the electrosurgical unit.

Figure 3B:
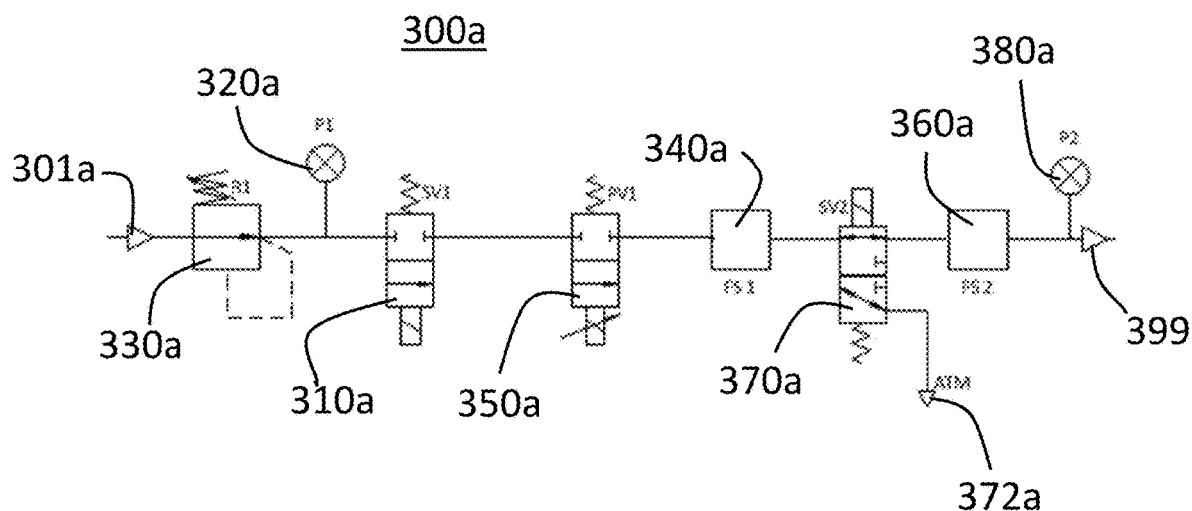
FIG. 3B is a schematic flow diagram illustrating the gas flow through an alternate embodiment of the module and the method by which the module controls the gas flow in accordance with a preferred embodiment of the present invention.

FIG. 3B is a schematic flow diagram of an alternate embodiment of a gas control module illustrating the gas flow through the gas control module 300a and the method by which the module 300a controls the gas flow in accordance with a preferred embodiment of the present invention. As shown in FIG. 3B, the gas enters the gas control module at an inlet port 301a and proceeds to a first pressure regulator (R1) 330a. In an exemplary embodiment, the first pressure regulator (R1) 330a reduces the pressor of the gas from about 50-100 psi to 15-25 psi. After the pressure regulator (R1) 330a, the gas proceeds to a first pressure sensor (P1) 320a and then to a first solenoid valve (SV1) 310a, which is an on/off valve. Next, the gas proceeds to proportional valve (PV1) 350a, which permits adjustment of a percentage of the opening in the valve. Next, the gas proceeds to flow sensor (FS1) 340a, which sense the flow rate of the gas. ext the gas proceeds to a second solenoid valve (SV2) 370a, which is a three-way valve that provides for a vent function that can allow gas to exit the module through a vent 372a. The gas then proceeds to a second flow sensor (FS2) 360a, which senses the flow rate of the gas. This second flow sensor (FS2) 360a provides redundancy and thus provides greater safety and accuracy in the system. The gas then proceeds to a second pressure sensor (P2) 380a, which provides a redundant pressure sensing function that against produces greater safety and accuracy of the system. The gas exits the module at and output port 399a, which is connected to tubing or other channel that provides a passageway for the gas to flow to an accessory connected to the electrosurgical unit.

The various valves and sensors in either embodiment of the module are electrically connected to a main PCB Board through a connector 490. The PCB connector 490 is connected to a PCB Board that has a microcontroller (such as CPU 210 in the embodiment shown in FIG. 2A). As previously noted, a plurality of gas modules can be in a single gas control unit or single electrosurgical generator to provide control of multiple differing gases. The plurality of gas control modules further may be connected to the same PCB Board, thus providing common control of the modules.

Figure 4:
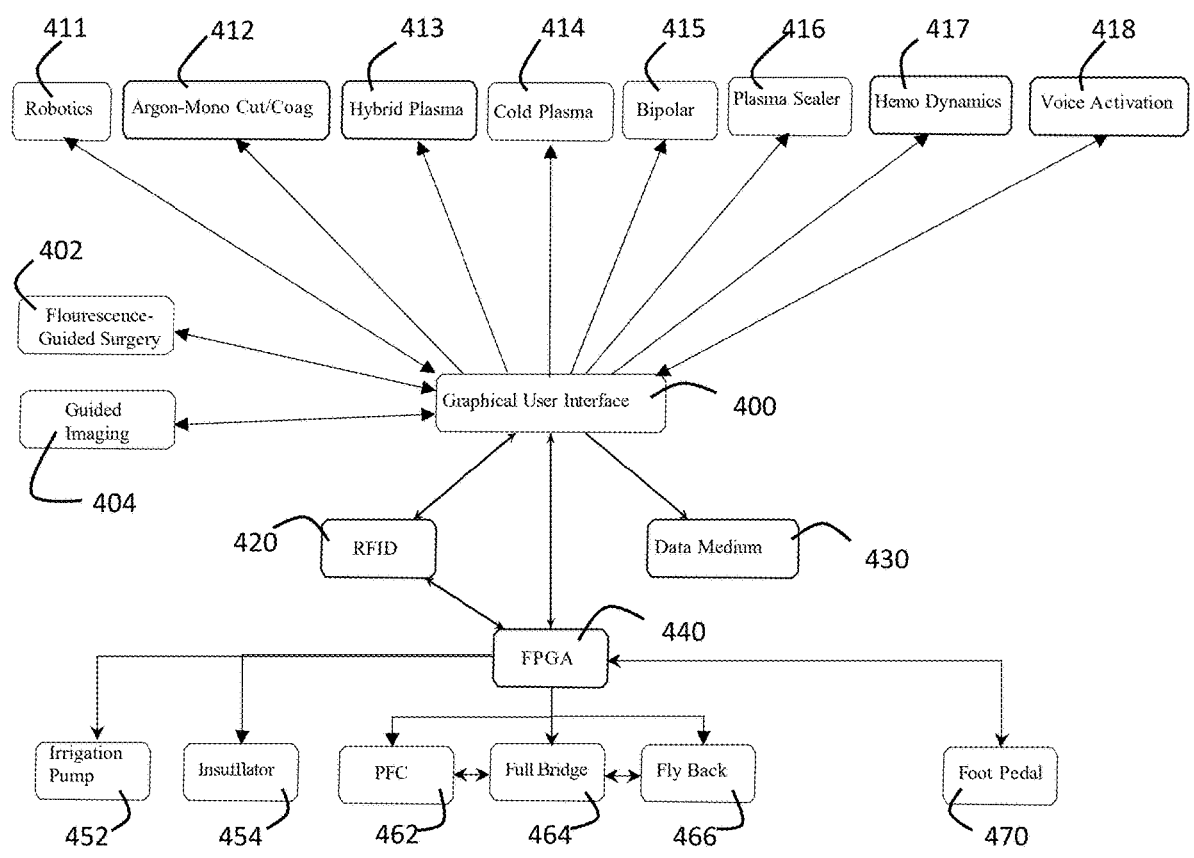
FIG. 4 is a diagram of a graphical user interface in accordance with a preferred embodiment of the present invention.

As shown in FIG. 4, the generator further may have graphical user interface 400 for controlling the components of the system using the touch screen display 120. The graphical user interface 400 for example, may control robotics 411, argon-monopolar cut/coag 412, hybrid plasma cut 413, cold atmospheric plasma 414, bipolar 415, plasma sealer 416, hemo dynamics 417 or voice activation 418. The graphical user interface further may be used with fluorescence-guided surgery 402. For example, J. Elliott, et al., "Review of fluorescence guided surgery visualization and overlay techniques," BIOMEDICAL OPTICS EXPRESS 3765 (2015), outlines five practical suggestions for display orientation, color map, transparency/alpha function, dynamic range compression and color perception check. Another example of a discussion of fluorescence-guided surgery is K. Tipirneni, et al., "Oncologic Procedures Amenable to Fluorescence-guided Surgery," Annals of Surgery, Vo. 266, No. 1, July 2017). The graphical user interface (GUI) further may be used with guided imaging such as CT, MRI or ultrasound. The graphical user interface may communicate with RFID 420 (such as may be found in various electrosurgical attachments) and may collect and store usage data in a storage medium 430. The graphical user interface 400 communicates with FPGA 440, which may control irrigation pump 452, insufflator 454, PFC 462, full bridge 464 for adjusting the power output, fly back 466 for regulating the power (DC to AC) and a foot pedal 470. The GUI 400 further communicates with a database of cancer cell line data with associated predicted CAP settings or dosages via the CPU 210. The databases storage may be internal memory or other internal storage 211 or external storage 212 as shown in FIGS. 2A and 2B. The data storage 430 in FIG. 4 may be in one or both memories or storages 211 or 212.

Figure 5A:
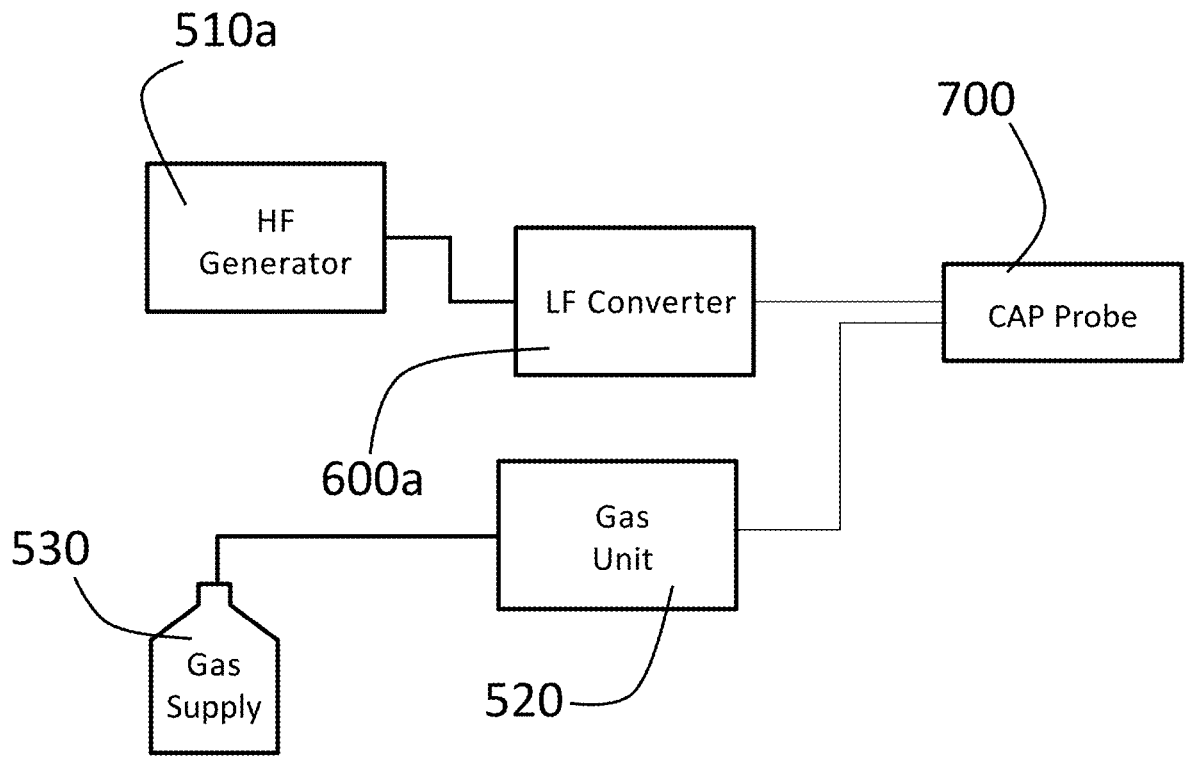
FIG. 5A is a diagram of a first embodiment of a system for producing cold plasma in accordance with the present invention.
Figure 5B:
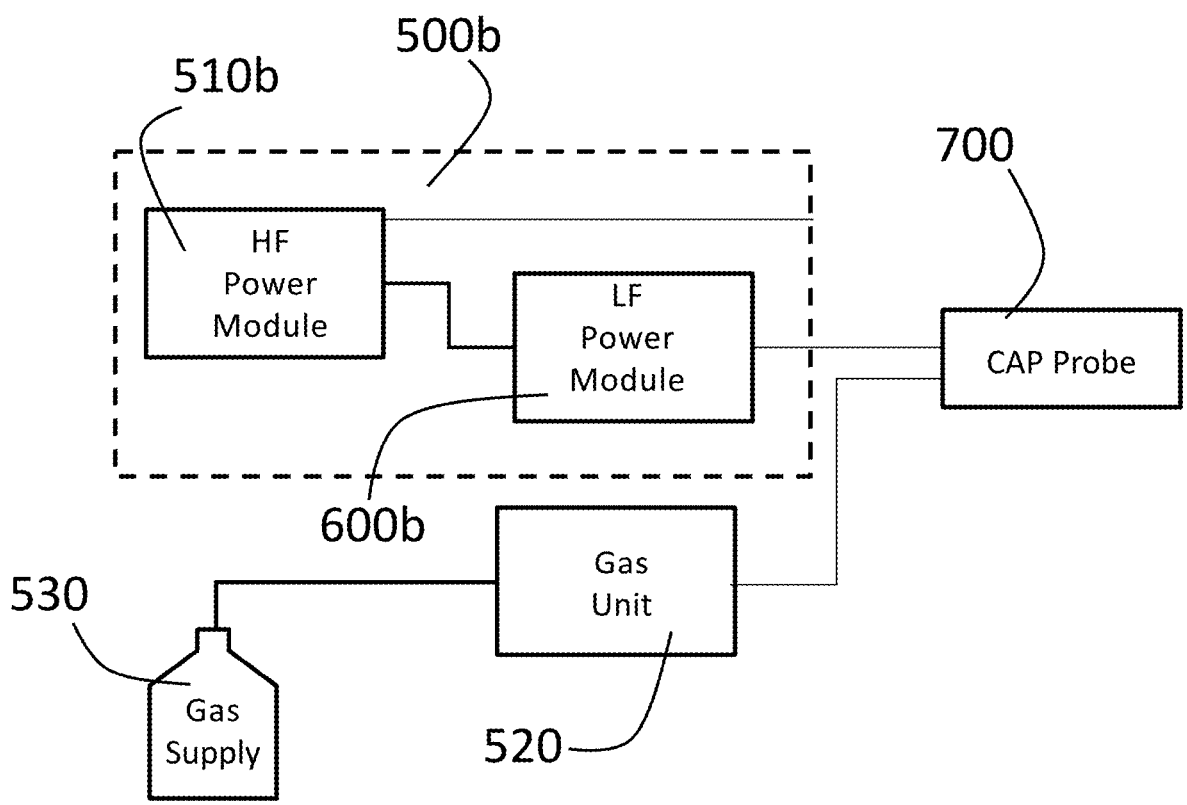
FIG. 5B is a diagram of a second embodiment of a system for producing cold plasma in accordance with the present invention.
Figure 5C:
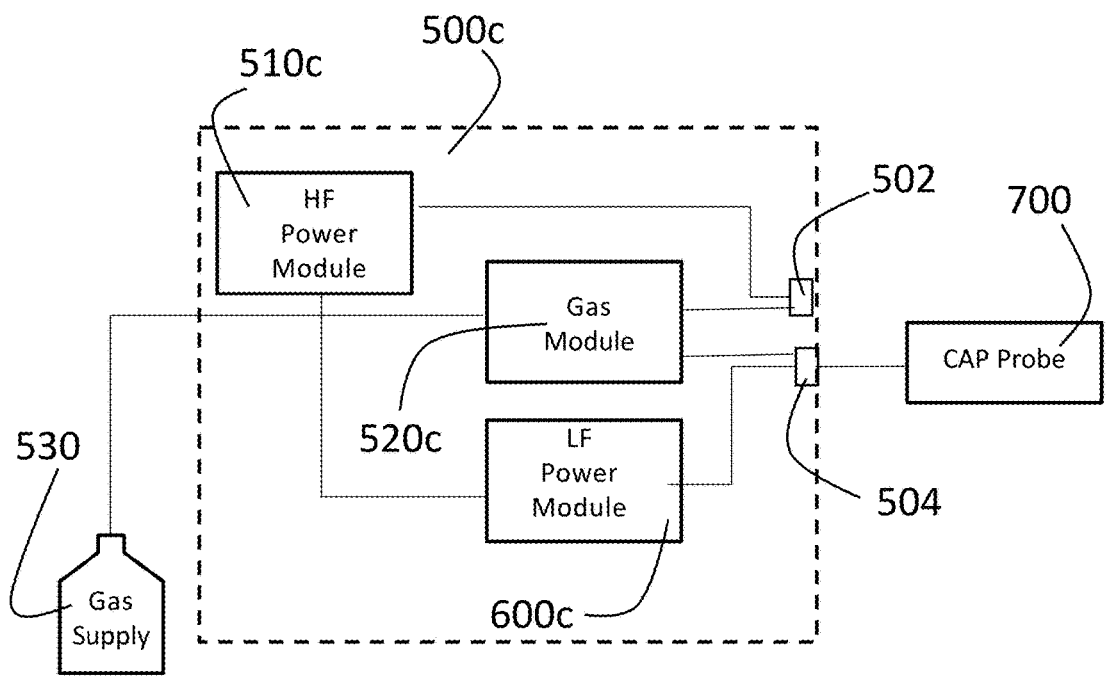
FIG. 5C is a diagram of a third embodiment of a system for producing cold plasma in accordance with the present invention.

A first embodiment of a system for producing cold plasmas is shown in FIG. 5A. The system has a high frequency (HF) electrosurgical generator or ESU, a low frequency (LF) converter 600, a gas unit 520, a gas supply 530 and a cold atmospheric plasma (CAP) probe 700. The CAP probe 700 is connected to an output of the LF power converter 600 and the gas unit 520. The gas supply 530 is a source of an inert gas such as helium. The gas unit 520 controls the flow of the inert gas to the CAP probe 300. The HF electrosurgical generator 510 supplies high frequency (HF) energy for performing electrosurgical procedures such as electrocautery, argon plasma coagulation and others. The HF energy, for example, may have a frequency of 500 kHz, meaning that the generator outputs energy at a range of frequencies centered at 500 kHz. If the generator is set, for example, at a power of 100 W, the 100 W power at the center frequency of 500 kHz will dominate the signal. Power levels at frequencies surrounding that center frequency will be lower the further those surrounding frequencies are from the center frequency. Conventional electrosurgical generators operate in this manner and would be known to those of skill in the art. In conventional electrosurgical generators, the dominant central frequency typically is in the range of 300 kHz-600 kHz. This dominant central frequency sometimes may be referred to as the "rated frequency."

Figure 6:
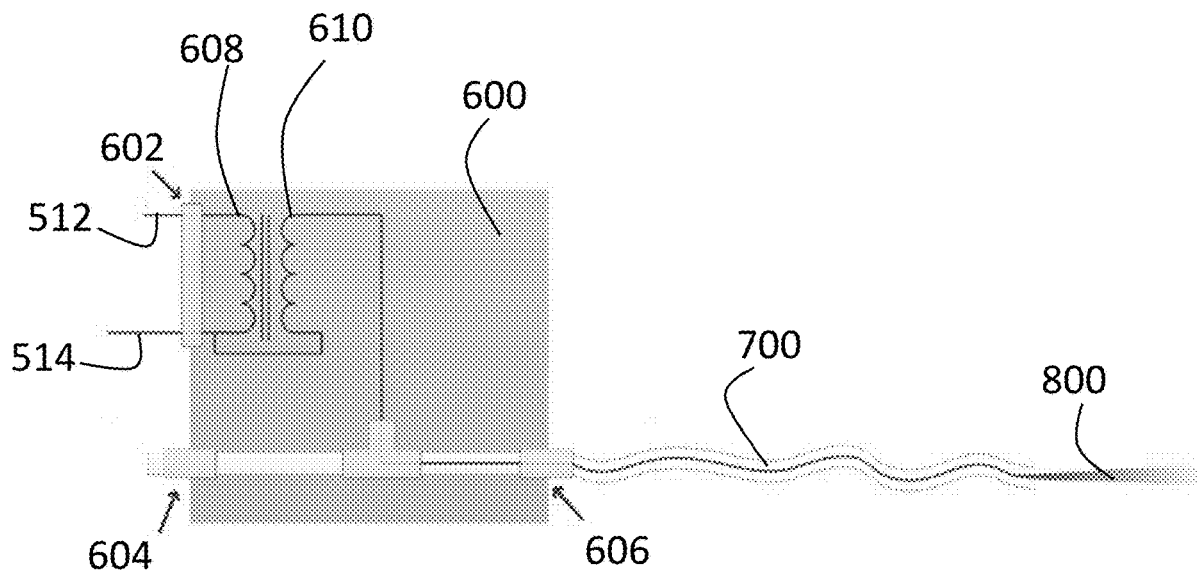
FIG. 6 is a diagram of a low frequency (LF) module and Cold Atmospheric Plasma (CAP) Probe in accordance with a preferred embodiment of the present invention.

The LF converter 600 utilizes a high voltage transformer connected to an output from ESU 510 as shown in FIG. 6. The transformer is a tuned transformer and is tuned to a lower frequency than the central frequency output from the ESU. In other words, the transformer operates as a resonant transformer with a resonant frequency lower than the output frequency of the ESU. For example, if the ESU outputs energy centered at 500 kHz, the transformer may have a resonant frequency of less than 300 kHz.

In a preferred embodiment, the transformer utilizes a primary coil 208 with $N_1$=60-70 turns and secondary coil 610 with about $N_2$=300 turns. The coils are wound on a ferrite core. The specific number of turns utilized in the transformer is given for illustrative purpose only and can be varied in a very wide range. The number $N_2$ should be larger than $N_1$ in order to produce step-up conversion of the voltage.

Experiments

Cytotoxicity effects of Trastuzumab and cold plasma on each cell line were quantified by MTT assay. Each cell line is plated in 96-well plates at a concentration of $5 \times 10^3$/well. After 24 h incubation, Trastuzumab at different dosages of 2, 4, 6, 8 ug/mL or cold plasma treatment for 30, 60, 90, 120 sec are applied separately, as shown in FIG. 7. 48 h after the treatment, MTT assay will be performed to determine the cell viability. As HER2-nagative cell lines, MDA-MB-231 and MCF-12A should not show a significant decrease in cell viability with Trastuzumab treatment even with a high concentration, while SkBr3, as HER2-positive cell line, should be killed by Trastuzumab at a dose-dependent manner. On the other hand, plasma treatment should induce cell death of the MDA-MB-23 I and SkBr3 cells, while MCF-12A will survive at least at low dosage treatments.

Data was plotted in Excel, and the $ID_{50}$ value, which is the median infective dose that will infect 50% of the experimental group, for Trastuzumab and cold plasma will be calculated. This calculated $ID_{50}$ (T) and $ID_{50}$ (P) is then applied to the viability measurement of cells treatment by Trastuzumab and cold plasma concomitantly.

Another MTT assay (FIG. 8) will be conducted to evaluate the synergistic effect. Three plates of each cell line will be treated by plasma at a dose of $Id_{50}$ (P), then treated with Trastuzumab at a dose of $ID_{50}$ (T) at the time point of O (immediately), 24 h, 48 h respectively after plasma treatment. MTT assay will be carried out after 48 h after Trastuzumab treatment. The combined treatment should induce significant decrease in MDA-MB-231 and SkBr3 cells, while MCF-12A cells are unharmed or slightly decreased.

HER2/ErbB2 (29D8) Rabbit mAb #2165 (Cell Signaling Technology) is a HER2-targeting antibody that can be used in western blotting, immunofluorescence. immunohistochemistry flow cytometry, and immunoprecipitation to quantify the HER2 expression. Before and after plasma treatment with or without Trastuzumab, confocal microscopy will be used to monitor the HER2 structure change.

CM-H2DCFDA (Life Technologies) is an indicator for reactive oxygen species (ROS) in cells. It passively diffuses into cells, where its acetate groups are cleaved by intracellular esterases and its thiol-reactive chloromethyl group reacts with intracellular glutathione and other thiols. Subsequent oxidation yields a fluorescent adduct that is trapped inside the cell, thus could be detected by a confocal microscope.

Intracellular ROS intensity of each cell line treated by Trastuzumab and cold plasma at the dose of $ID_{50}$ (T) and $ID_{50}$ (P) separately and cooperatively should be measured. It is expected that the ROS intensity of Trastuzumab treated cancer cells is low; that after cold plasma treatment and combined treatment cells is high.

Plasma can lead to cancer cell apoptosis, including breast cancer cells as shown above. But in terms of mechanism, no specific DNA or protein studies has been conducted. The expression of HER2 receptor in the three cell lines before or after plasma treatment will be monitored by western blot using HER2/ErbB2 (29D8) Rabbit mAb #2165 (Cell Signaling Technology). It is expected that the HER2 expression in MDA-MB-231 cells treated by plasma will be significantly higher than untreated.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for treating breast cancer comprising:
   treating HER2-negative breast cancer cells with Trastuzumab at a median infective dose ($ID_{50}$) value for the Trastuzumab; and
   treating said HER2-negative breast cancer cells with cold atmospheric plasma at a median infective dose ($ID_{50}$) value for the cold atmospheric plasma treatment to overcome Trastuzumab invalidity or resistance and to enhance the outcome of the Trastuzumab treatment.

2. A method for treating breast cancer cells, comprising:
   treating first samples of a breast cancer cell line with Trastuzumab at various dosages;
   calculating a median infective dose ($ID_{50}$) value for Trastuzumab with a processor based on results of said treating first samples and storing the calculated values in an electronic storage;
   treating second samples of the breast cancer cell line with cold atmospheric plasma at various settings;
   calculating an $ID_{50}$ value for the cold atmospheric plasma treatment with a processor based on results of said treating second samples and storing the calculated values in an electronic storage; and treating cancer cells concomitantly with Trastuzumab and cold atmospheric plasma at the stored $ID_{50}$ values.

3. A method for treating breast cancer cells according to claim 2 wherein the breast cancer cells are HER2-negative cancer cells.

* * * * *